United States Patent
Kilroy et al.

(10) Patent No.: US 8,659,856 B2
(45) Date of Patent: Feb. 25, 2014

(54) DC ARC FAULT DETECTION AND PROTECTION

(75) Inventors: Donald G. Kilroy, Rockford, IL (US); Wayne H. Oldenburg, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 1548 days.

(21) Appl. No.: 11/298,438

(22) Filed: Dec. 9, 2005

(65) Prior Publication Data

US 2007/0133135 A1    Jun. 14, 2007

(51) Int. Cl.
*H02H 3/087* (2006.01)

(52) U.S. Cl.
USPC .......................................................... 361/42

(58) Field of Classification Search
USPC .......................................................... 361/42
See application file for complete search history.

(56) References Cited

U.S. PATENT DOCUMENTS

| | | | |
|---|---|---|---|
| 4,466,071 A | | 8/1984 | Russell, Jr. |
| 5,138,513 A | * | 8/1992 | Weinstein .......................... 361/2 |
| 5,991,567 A | * | 11/1999 | Kobayashi et al. ........... 399/101 |
| 6,420,863 B1 | | 7/2002 | Milde et al. |
| 6,522,509 B1 | * | 2/2003 | Engel et al. ...................... 361/42 |
| 2003/0137309 A1 | | 7/2003 | Itimura et al. |
| 2004/0027749 A1 | * | 2/2004 | Zuercher et al. ................. 361/62 |
| 2004/0156154 A1 | | 8/2004 | Lazarovich |
| 2004/0246846 A1 | * | 12/2004 | Takahashi et al. ............ 369/53.2 |
| 2005/0099901 A1 | * | 5/2005 | Raaymakers et al. ..... 369/44.28 |
| 2005/0135025 A1 | * | 6/2005 | Escoda ........................... 361/42 |

FOREIGN PATENT DOCUMENTS

| | | |
|---|---|---|
| DE | 10319456 | 11/2004 |
| DE | 10319456 A1 | 11/2004 |
| WO | WO01/73912 A1 | 10/2001 |

OTHER PUBLICATIONS

Partial European Search Report dated Mar. 3, 2010.
Partial European Search Report for EP Application No. 12165592.2 dated Jun. 15, 2012.
Extended European Search Report mailed on Jul. 26, 2010 for EP 06256200.

* cited by examiner

*Primary Examiner* — Rexford Barnie
*Assistant Examiner* — Ann Hoang
(74) *Attorney, Agent, or Firm* — Carlson, Gaskey & Olds, P.C.

(57) ABSTRACT

A DC arc fault device and methodology includes acquiring a signal in response to a DC current. A software module identifies a parallel DC arc event when a difference between a maximum signal value and a minimum signal value exceeds a threshold. The software module also determines average signal values over multiple selected time periods and identifies a series DC arc event in response to the difference between the average values exceeding a predetermined threshold.

16 Claims, 6 Drawing Sheets

DC ARC FAULT DETECTION AND PROTECTION

BACKGROUND OF THE INVENTION

This invention relates to identification of electrical arc faults and, more particularly, to methodology for identifying the occurrence of DC arc events.

Conventional electrical systems that utilize electrical wiring, equipment, and related interconnections may degrade with time, temperature, moisture, vibration, or other environmental conditions. Degradation of electrical wire insulation, for example, can result in electrical events that increase an operating temperature of the electrical system and, in extreme conditions, lead to fire.

Conventional electrical systems typically employ an electrical protection device to protect from such electrical events that typically result in relatively large spikes in electric current. A thermal circuit breaker, for example, trips to open the circuit when the temperature exceeds a predetermined temperature. Alternatively, a solid-state power controller monitors electrical current and trips if the current exceeds a preset energy rating.

Particular electrical events, such as electrical arcing, can be inherently low impedance and occur infrequently. This infrequent occurrence will prevent a thermal circuit breaker from reaching the temperature threshold or a solid-state power controller from reaching a preset energy rating. As a result, conventional thermal circuit breakers and solid-state power controllers typically do not trip when an electric arc occurs, even though it is desirable to detect electric arc events for purposes such as identifying an electrical problem and preventing the problem from causing additional damage.

Several electrical protection devices attempt to address electric arc detection. An additional hard-wired arc-detecting circuit, for example, may be utilized in conjunction with the thermal circuit breaker to detect a DC electric arc and initiate a trip electro-mechanically. Likewise, an additional hard-wired arc-detecting circuit may be utilized in conjunction with a power controller to detect a DC electric arc and initiate a trip. Use of hard-wired circuitry may increase the size and weight of the electrical protection device and add expense.

Alternatively, other devices attempt to provide a "one size fits all" approach to identifying electrical arc faults. These types of devices purport to identify electrical arc events for both DC and AC electrical power by comparing electric current with known acceptable load currents and generate a fault signal if the comparison is undesirable. However, since DC and AC electrical power are inherently different, these devices and methodologies inherently overlook the differences between DC and AC in identifying electric arc faults. Furthermore, these devices and methodologies lack intelligence capability to disregard transient electrical events, characterize an electrical arc event, or identify an arc event based on the DC or AC nature of the electrical current.

Accordingly, there is a need for a compact, inexpensive, and intelligent device and methodology to identify DC electric arc events.

SUMMARY OF THE INVENTION

A method of parallel DC arc event detection according to the present invention includes acquiring a signal representing DC electrical current. A software module identifies a parallel DC arc event when a difference between a maximum signal value and a minimum signal value exceeds a threshold.

A method of series DC arc fault detection according to the present invention includes acquiring a signal representing DC electrical current over multiple selected time periods and determining an average signal value for each time period. A software module then compares the average signal values to each other. If the average signal values differ by more than a pre-determined amount, the software module identifies a series DC event.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
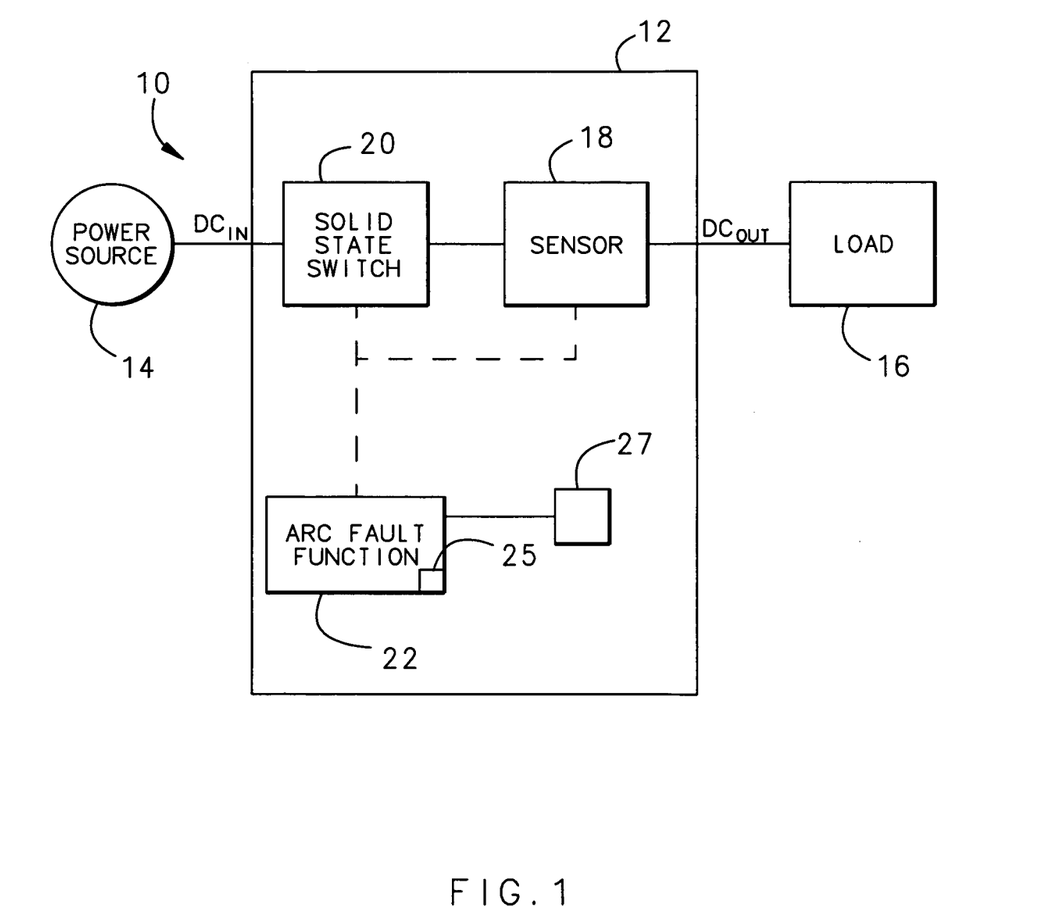
FIG. 1 schematically illustrates an example of a simplified electrical system utilizing a software module that detects DC arc faults.

FIG. 1 illustrates selected portions of an example electrical system 10 having a solid-state power controller 12 that receives DC electrical power from a power source 14. The solid-state power controller 12 includes a sensor 18 for sensing the DC electrical current and a solid-state switch 20 for selectively switching DC electrical power to a desired load 16.

A software module 22 is integrally connected with the sensor 18 and the solid-state switch 20. The software module 22 acquires a signal representing the DC electrical current and analyzes the signal to identify occurrences of DC arc faults, as will be described below.

The software module 22 includes a digital counter 25, such as an accumulator, and is capable of annunciating the fault through a communication interface such as a serial communication interface, other known interface, or with an indicator 27.

Figure 2:
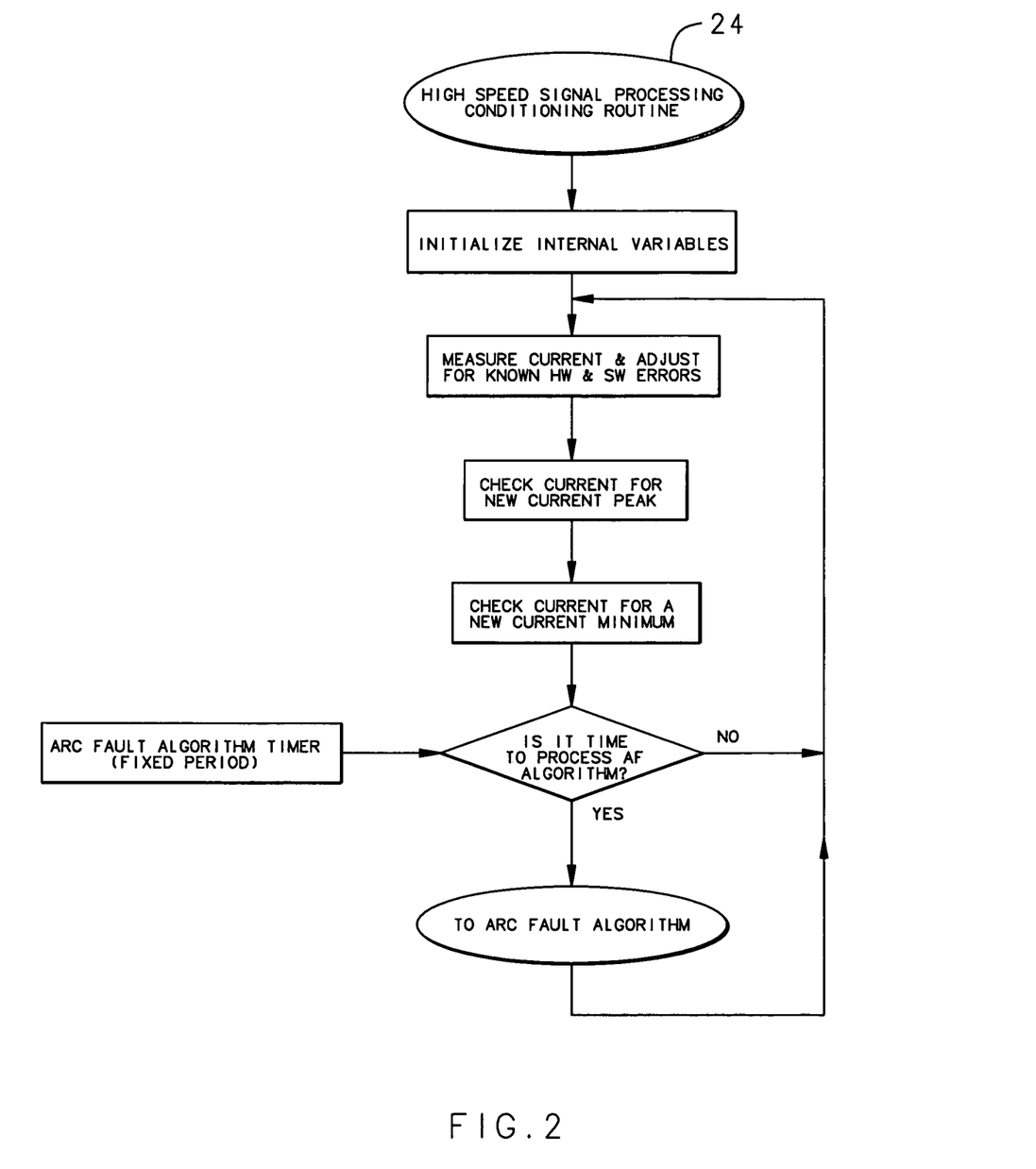
FIG. 2 illustrates an algorithm utilized by the software module of FIG. 1 for acquiring a DC signal.

Referring to FIG. 2, the software module 22 acquires the signal in a generally known manner, which includes high speed signal processing and conditioning shown starting at step 24.

Figure 3:
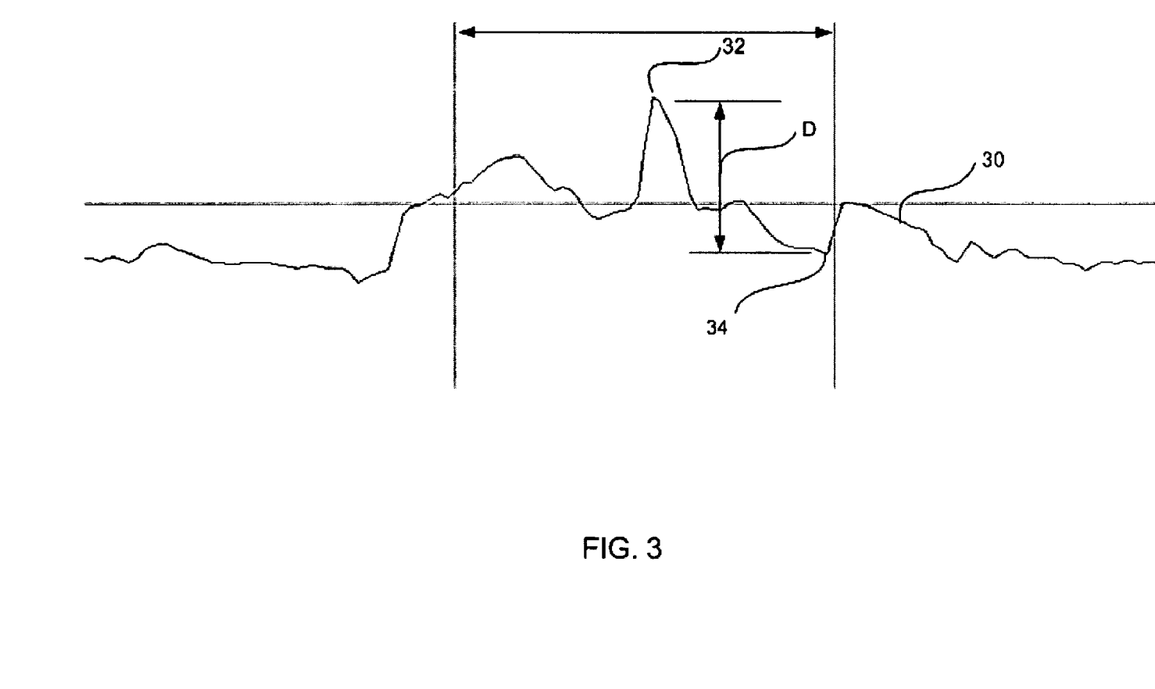
FIG. 3 shows an acquired signal and determination of a parallel DC arc event.

FIG. 3 shows parallel DC arc event detection. The software module 22 analyzes the signal 30 for both parallel and series DC arc events. A parallel DC arc fault refers to a predetermined number of DC arc events within a selected time period. A series DC arc event refers to change in average DC electrical current values over several predetermined time periods. Multiple DC arc events constitute a DC arc fault. The example electrical system 10 (FIG. 1) provides the benefit of utilizing a single sensor 18 for both overcurrent protection and arc event or fault protection.

In the illustration, the signal 30 represents the DC electrical current magnitude versus time. The software module 22 monitors the signal 30 over a sliding time period X and identifies a maximum at 32 and a minimum at 34. The software module 22 determines a difference D between the maximum 32 and the minimum 34, and compares the result to a predetermined threshold according to the equation:

Maximum−Minimum>Threshold

The software module 22 identifies a DC arc event when the result is greater than the predetermined threshold. If a predetermined number of DC arc events occur within a selected period, the software module 22 concludes that there is a DC electrical arc fault and initiates an output action, as described below.

Identifying a DC arc fault through a characteristic such as a maximum and minimum current and counting the number of these DC arc events in a selected time period to determine whether there is an arc fault, provides the benefit of ignoring nuisance and transient spikes in current. Furthermore, this avoids identifying arc faults based upon a rate of change of the current, which is a drawback with prior devices and methodologies that can lead to misidentification of arc faults. Additionally, the electrical system 10 need not include the conventionally required added circuitry for identification of arc faults.

Identifying a DC arc fault through a characteristic such as a maximum and minimum current and counting the number of DC arc events over a selected time period provides for identification of DC arc faults and may not be ideally suited for AC arc fault identification. Unlike AC electrical power, DC electrical power has no regular cycle of changing current direction in which an arc typically extinguishes. As a result, AC electrical arcing typically occurs over a known current cycle, but DC electrical arcing may occur over a longer period of time. Therefore, the methodology of detecting DC arcs is somewhat different than for detecting AC arcs. Utilizing a maximum and minimum current over a selected time period may result in misidentification of AC arcs.

Upon identifying a DC arc event, or alternatively, a predetermined number of DC arc events within a time period (i.e., an arc fault), the software module 22 selects an output action from one of several available output actions. One possible output action is to open the solid-state switch 20 to prevent DC electrical power from being connected to the load 16. This provides the advantage of isolating a DC arc fault downstream from the solid-state power controller 12.

Another possible output action is to send a DC arc event or fault signal to the indicator 27 to indicate, for example, to a vehicle occupant that there is a potential electrical problem. During this time, the solid-state power controller 12 continues to connect DC electrical power to the load 16; however, the indicator 27 indicates a potential electrical problem. Alternatively, software module 22 takes no output action in response to detection of the DC arc event or fault.

Selecting from one of several output actions provides the benefit of configuring the electrical system so that each solid-state power controller responds in a preselected manner to detected DC arc events or faults.

Figure 4:
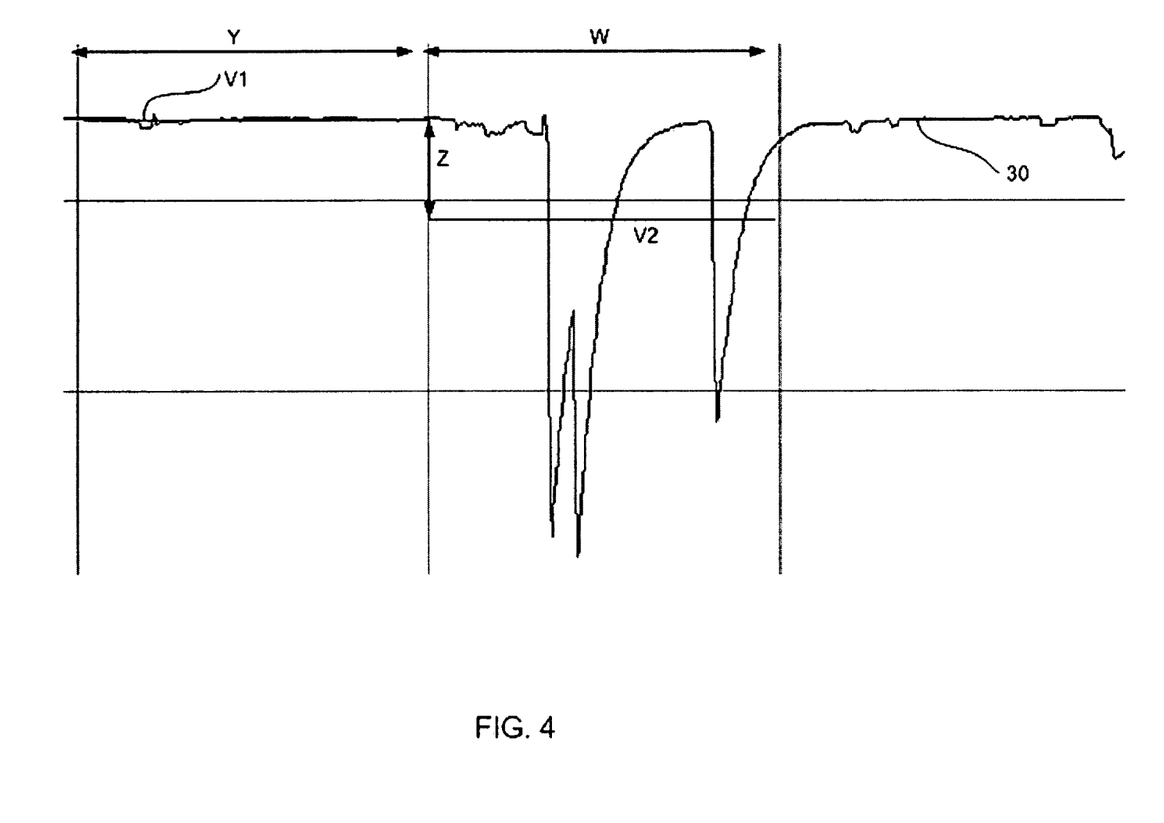
FIG. 4 shows an acquired signal and determination of a series DC arc event.

Referring to FIG. 4, the software module 22 also integrates the signal 30 over time to determine an average signal value for series arc event detection in conjunction with the parallel arc event detection described above. An average signal value is determined over several desired time periods, Y and W for example. In the illustration, the software module 22 determines the average signal value $V_1$ and an average signal value $V_2$. The software module 22 compares the average signal value $V_1$ to the average signal value $V_2$. If a difference Z between the average signal value $V_1$ and the average signal value $V_2$ exceeds a predetermined threshold, the software module 22 increases a value of the digital counter 25 (FIG. 1). If the difference is below the predetermined threshold, the software module 22 decreases the value of the digital counter 25.

Optionally, a minimum current qualifier can be included to prevent nuisance DC arc fault series protection due to very small currents.

Optionally, the magnitudes of the values that the software module increases or decreases the digital counter 25 may be made unequal to achieve a fast charge, slow discharge integration.

The digital counter 25 exceeding a predetermined threshold represents a series DC arc fault condition. The software module 22 identifies a series DC arc fault. The software module 22 then selects one of the several output actions, as described above.

Utilizing the software module 22 to identify both parallel and series DC arc fault events provides the advantage of characterizing electrical problems within the electrical system 10. For example, parallel DC arc events often correspond to electrical problems within a wire bundle, while series DC arc events often correspond to a loose connection. This enables the software module 22 to characterize electrical problems and respond in a desired manner through one of the predefined output actions.

The software-based methodology described is robust enough to maintain DC arc fault monitoring capability if the software becomes corrupted by single event upsets, such as bit flipping from cosmic radiation, etc., and does not passively fail as long as current is sensed.

Figure 5:
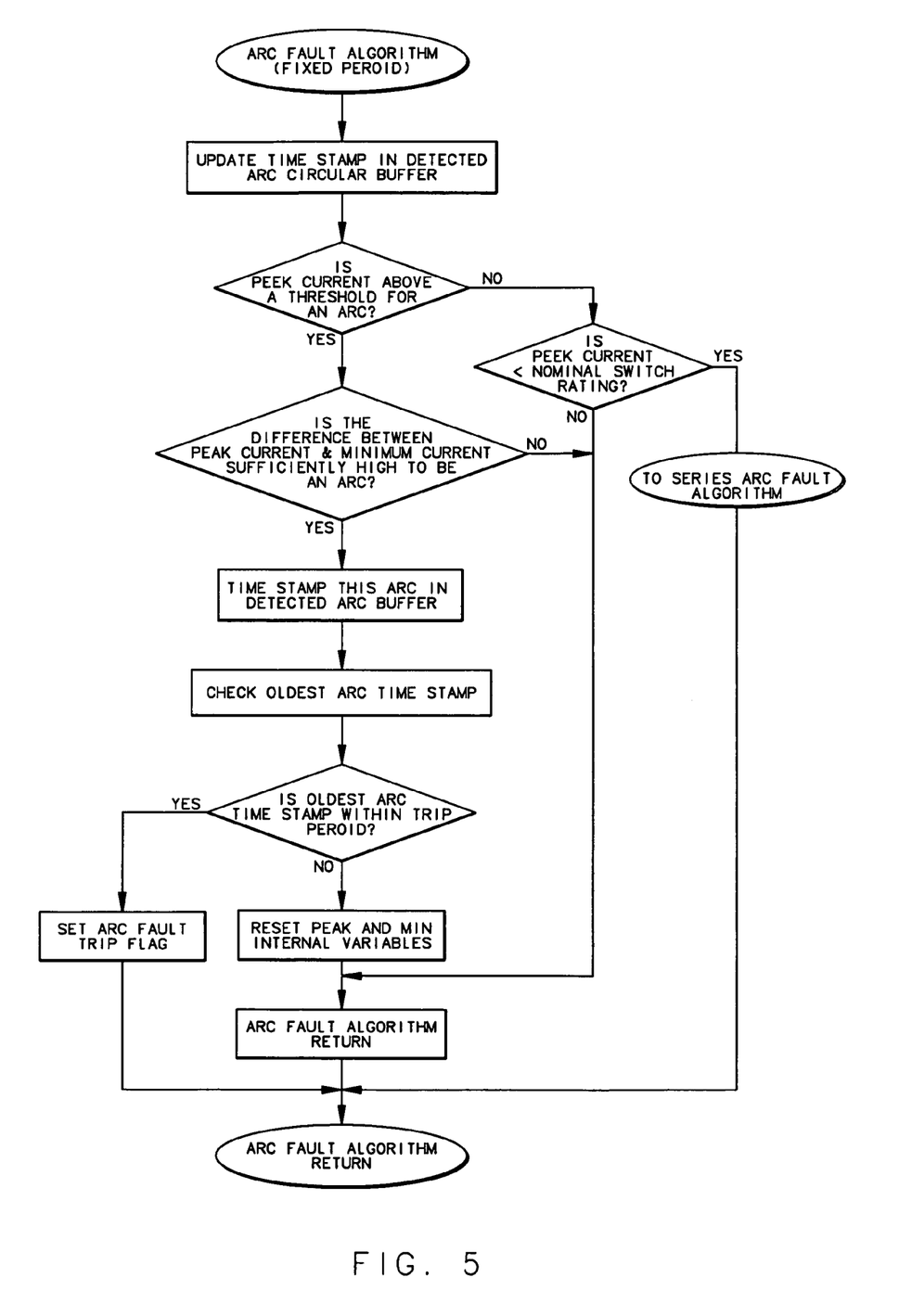
FIG. 5 shows an example algorithm for parallel DC arc fault determination.

FIG. 5 shows an example algorithm for identifying a parallel DC arc fault as described above. Although the example shows specific steps, given this description, one of ordinary skill in the art might recognize alternative steps to achieve parallel DC arc fault detection.

Figure 6:
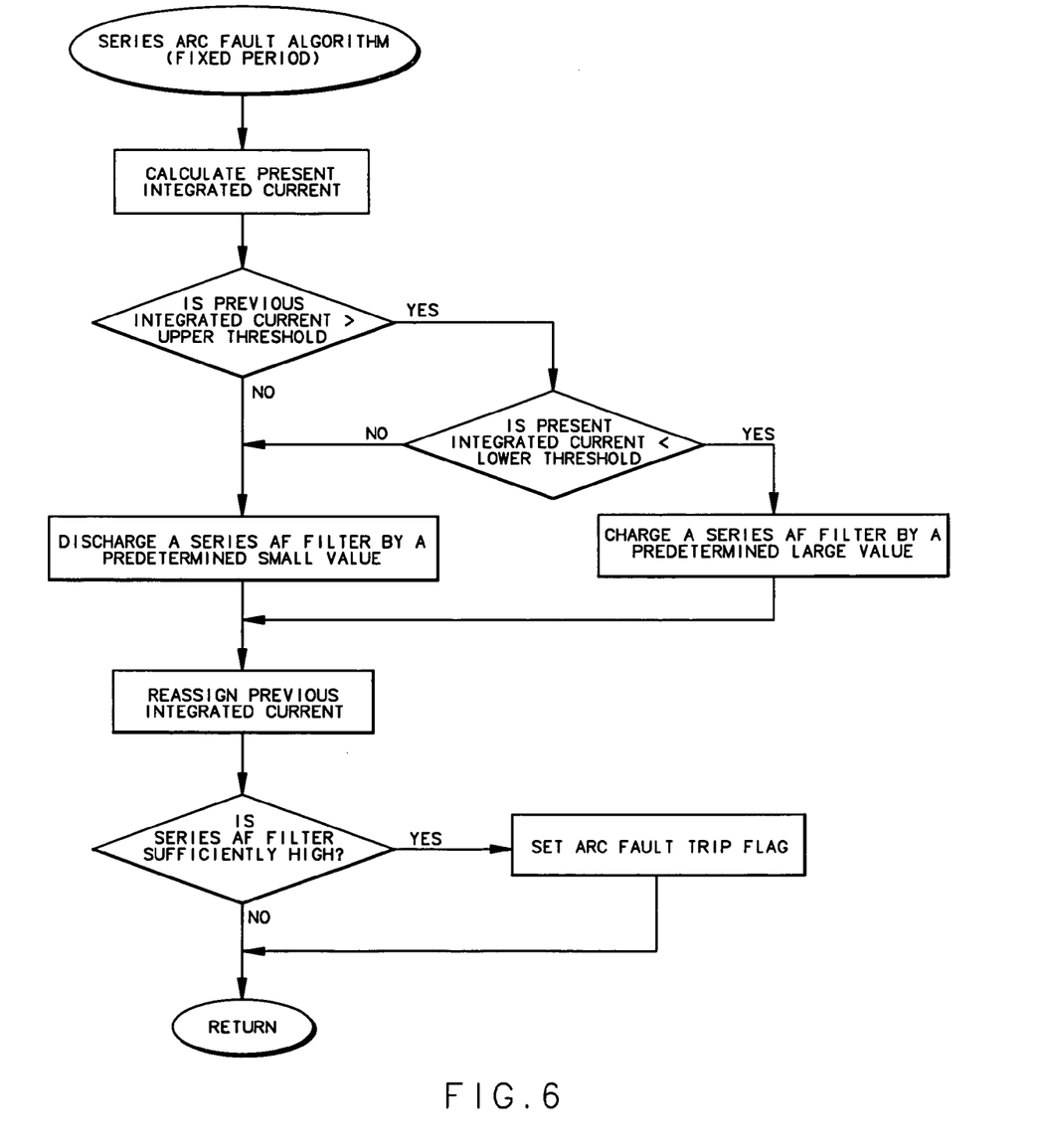
FIG. 6 shows an example algorithm for series DC arc fault determination.

FIG. 6 shows an example algorithm for detecting a series DC arc fault. Although a specific algorithm is shown, given this description, one of ordinary skill in the art might recognize alternative steps to achieve series DC arc fault detection.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of DC arc event detection, comprising:
   (a) acquiring a signal representing DC electrical current over a time period;
   (b) determining a first signal value based upon a maximum signal value over the time period;
   (c) determining a second signal value based upon a minimum signal value over the time period; and
   (d) defining a DC arc event based at least partially upon the first signal value and the second signal value, including determining a difference between the first signal value and the second signal value, comparing the difference to a predetermined threshold signal value, and defining a DC arc event in response to the difference exceeding the threshold signal value.

2. The method as recited in claim 1, including (e) commanding a solid-state switch to open in response to defining the DC arc event in said step (d).

3. The method as recited in claim 1, including (e) commanding a solid-state switch to an open state in response to defining multiple DC arc events in said step (d).

4. The method as recited in claim 1, including (e) maintaining a solid-state switch in a closed state and providing an indication of the DC arc event in response to defining the DC arc event or multiple DC arc events in said step (d).

5. The method as recited in claim 1, wherein said signal of said step (a) is a DC waveform.

6. A method of DC arc fault detection, comprising:
(a) acquiring a signal representing a direct electrical current over multiple selected time periods;
(b) determining a value for each time period in response to the signal, wherein the determining of the value is based upon an average signal value over one of the multiple selected time periods;
(c) determining a difference between values from different time periods; and
(d) defining a DC arc event based at least partially upon the difference, including comparing the difference to a predetermined threshold signal value and defining a DC arc event in response to the difference exceeding the threshold signal value.

7. The method as recited in claim 6, including (e) commanding a solid-state switch to one of an open or closed state and providing an indication in response to defining the DC arc event or multiple DC arc events in said step (d).

8. A method of DC arc fault detection, comprising:
(a) acquiring a signal representing a direct electrical current over multiple selected time periods;
(b) determining a value for each time period in response to the signal wherein the determining of the value is based upon an average signal value over one of the multiple selected time periods;
(c) determining a difference between values from different time periods;
(d) defining a DC arc event based at least partially upon the difference; and
(e) adding a first value to a counter if the difference between values exceeds a predetermined threshold.

9. The method as recited in claim 8, including (f) subtracting a second value that is smaller than the first value from the counter if the difference does not exceed the predetermined value.

10. A device for detecting DC arc faults comprising:
a solid-state switch that selectively transmits direct current electric power; and
a software module that acquires a signal representing said direct current over a selected time period, determines maximum and minimum signal values over the time period, determines a difference between the maximum and minimum signal values over the time period, compares the difference to a predetermined threshold signal value, and defines a DC arc event in response to the difference exceeding the threshold signal value, wherein said software module commands said solid-state switch to an open state in response to the DC arc event.

11. The device as recited in claim 10, wherein said software module acquires said signal over multiple selected time periods and commands said solid-state switch to an open state based upon an average signal value for each time period.

12. The method as recited in claim 10, wherein said signal is a DC waveform.

13. A device for detecting DC arc faults comprising:
a solid-state switch that selectively transmits direct current electric power; and a software module that acquires a signal representing said direct current over a selected time period and determines maximum and minimum signal values over the time period, wherein said software module commands said solid-state switch to an open state based upon said maximum and minimum signal values, wherein said software module acquires said signal over multiple selected time periods and commands said solid-state switch to an open state based upon an average signal value for each time period, and wherein said software module includes a digital counter that increases by a first value if a difference between the average signal values exceeds a predetermined threshold.

14. The device as recited in claim 13, wherein said digital counter decreases by a second value that is smaller than the first value if the difference does not exceed the predetermined value.

15. A method of DC arc fault detection, comprising:
(a) acquiring a signal representing a direct electrical current over multiple selected time periods;
(b) determining a value for each time period in response to the signal wherein the determining of the value is based upon an average signal value over one of the multiple selected time periods;
(c) determining a difference between values from different time periods: and
(d) defining a DC arc event based at least partially upon the difference, including defining said DC arc event based at least partially upon the difference of said step (c) if the values from step (c) are greater than a nuisance threshold.

16. A device for detecting DC arc faults comprising:
a solid-state switch that selectively transmits direct current electric power; and a software module that acquires a signal representing said direct current over a selected time period and determines maximum and minimum signal values over the time period, wherein said software module commands said solid-state switch to an open state based upon said maximum and minimum signal values, wherein said software module commands said solid-state switch to said open state based upon said maximum and minimum values if a difference between said maximum and minimum values over several time periods is greater than a nuisance threshold.

* * * * *

UNITED STATES PATENT AND TRADEMARK OFFICE
CERTIFICATE OF CORRECTION

PATENT NO. : 8,659,856 B2  Page 1 of 1
APPLICATION NO. : 11/298438
DATED : February 25, 2014
INVENTOR(S) : Kilroy et al.

It is certified that error appears in the above-identified patent and that said Letters Patent is hereby corrected as shown below:

IN THE CLAIMS:

Claim 6, column 5, line 16: delete "are" and replace with --arc--

Claim 6, column 5, line 18: delete "are" and replace with --arc--

Claim 8, column 5, line 25: delete "are" and replace with --arc--

Claim 10, column 5, line 42: delete "are" and replace with --arc--

Claim 10, column 5, line 51: delete "are" and replace with --arc--

Claim 10, column 5, line 54: delete "are" and replace with --arc--

Claim 13, column 6, line 8: delete "are" and replace with --arc--

Claim 15, column 6, line 27: delete "are" and replace with --arc--

Claim 15, column 6, line 37: delete "are" and replace with --arc--

Claim 16, column 6, line 41: delete "are" and replace with --arc--

Signed and Sealed this
Twenty-seventh Day of May, 2014

Michelle K. Lee
*Deputy Director of the United States Patent and Trademark Office*